(12) United States Patent
Collins et al.

(10) Patent No.: US 6,182,134 B1
(45) Date of Patent: Jan. 30, 2001

(54) CONFIGURABLE SYSTEM FOR REMOTELY MANAGING COMPUTERS

(75) Inventors: Michael G. Collins, Orem; Michael B. Earl, Lindon; Jay G. Geertsen, American Fork, all of UT (US)

(73) Assignee: Intel Corporation, Santa Clara, CA (US)

(*) Notice: Under 35 U.S.C. 154(b), the term of this patent shall be extended for 0 days.

(21) Appl. No.: 08/916,795

(22) Filed: Aug. 25, 1997

(51) Int. Cl.[7] .............................. G06F 17/30; G06F 15/16
(52) U.S. Cl. ............................... 709/224; 345/326
(58) Field of Search ........................... 707/104; 709/222, 709/200, 224, 223; 714/50, 51, 52; 345/347, 349, 333, 326

(56) References Cited

U.S. PATENT DOCUMENTS

| | | | |
|---|---|---|---|
| 5,261,044 | * 11/1993 | Dev et al. ........................... | 345/349 |
| 5,483,631 | * 1/1996 | Nagai et al. ........................ | 345/347 |
| 5,638,514 | * 6/1997 | Yoshida et al. ..................... | 709/224 |
| 5,819,028 | * 10/1998 | Manghirmalani et al. .......... | 709/224 |
| 5,832,503 | * 11/1998 | Malik et al. ........................ | 707/10 |

* cited by examiner

Primary Examiner—Dung C. Dinh
(74) Attorney, Agent, or Firm—Kenyon & Kenyon

(57) ABSTRACT

A system for remotely managing computers includes a plurality of managed computers coupled to a management computer. At least one managed computer generates management data and provides one or more display templates, and transmits the management data and display templates to the management computer. The management computer provides information regarding the managed computers by displaying the management data in accordance with the display templates.

26 Claims, 6 Drawing Sheets

CONFIGURABLE SYSTEM FOR REMOTELY MANAGING COMPUTERS

FIELD OF THE INVENTION

The present invention is directed to a system for remotely managing computers. More particularly, the present invention is directed to a system for remotely managing computers that is configurable by the managed computers.

BACKGROUND OF THE INVENTION

Connecting computers together through a computer network provides many advantages. Users of networked computers can, for example, exchange files and electronic mail and share printers, disk drives, modems and other computer resources across the network. Because of these advantages, computer networks are proliferating.

Many networks include a wide variety of computing platforms. For example, a computer network may include computers that execute a Windows®-based operating system as well as computers that execute a Unix-based operating system. It is desirable to provide the ability to remotely manage each different type of computer on a network, and to remotely manage individual computers, from a single computer referred to as a "management computer".

With most known methods for remotely managing computers using a management computer, each computer that is remote from the management computer, referred to as a "managed computer", typically generates management data regarding its managed resources (the management computer can also be considered a "managed computer" if it is managing itself). The management data is then made available to the management computer. An example of management data is disclosed in the Desktop Management Interface ("DMI") Version 2.0 specification, which was issued on Mar. 29, 1996 by the Desktop Management Task Force ("DMTF"). DMI 2.0 defines a standardized Management Information Format ("MIF") database that is included on each managed computer. The MIF database on each managed computer includes DMI data for managed resources under the control of that computer. The management data generated by the managed computers can then be used by a management computer.

However, in the known methods for remotely managing computers, the management computer must be made aware of every managed computer and their corresponding managed computer resources before it can request management data and manage the computers. This requires the management computer to be extensively programmed, or "configured" before managing the computers, and reconfigured when managed computer resources under the control of the remote computers are changed.

Further, in the known methods for remotely managing computers, the management computer must determine how to display the management data after the data is received. This requires the management computer to be configured with each desired method of displaying the management data before the management data is requested. In order to simplify the configuration of the management computer, all management data received from the managed computers is typically displayed in an identical tabular format on the management computer. This makes it difficult for a user of the management computer to read and interpret the management data.

Based on the foregoing, there is a need for a system for remotely managing computers from a management computer in which the management computer is not required to be configured before managing the computers or when managed resources change, and in which management data received from the managed computers is displayed in a customized manner in accordance with each managed computer.

SUMMARY OF THE INVENTION

One embodiment of the present invention is a system for remotely managing computers. The system includes a plurality of managed computers coupled to a management computer. At least one managed computer generates management data, provides one or more display templates, and transmits the management data and display templates to the management computer. The management computer provides information regarding the managed computers by displaying the management data in accordance with the display templates.

DETAILED DESCRIPTION

One embodiment of the present invention is a system for remotely managing computers in which the management functionality, characteristics, and display preferences of the managed computers are provided to a management computer by the managed computers. This causes the management computer to display management data in a customized manner in accordance with the managed computers.

Figure 1:
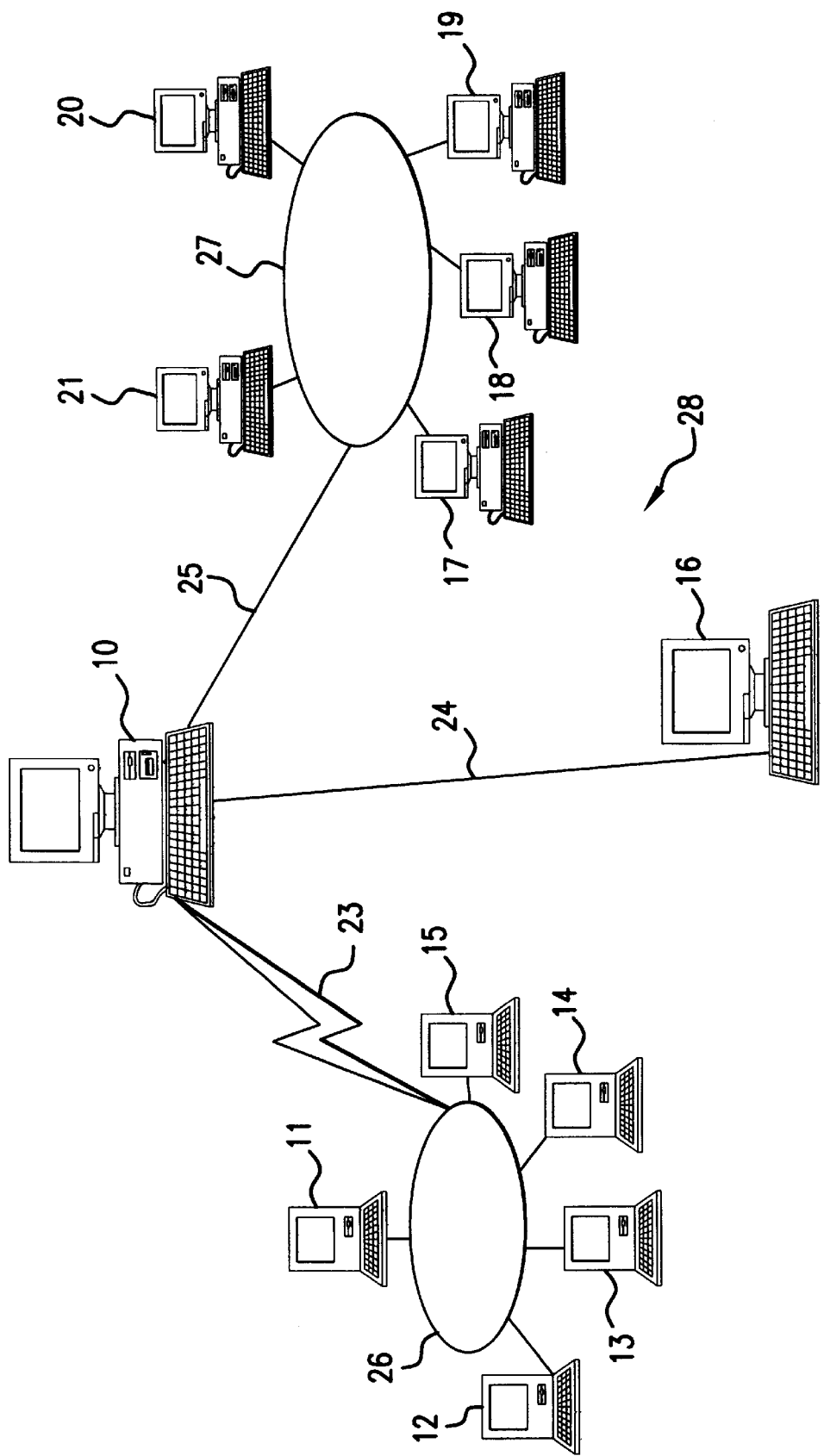
FIG. 1 illustrates an example of a computer network that can implement the present invention.

FIG. 1 illustrates an example of a computer network 28 that can implement the present invention. Computer network 28 includes a management computer 10 and a plurality of managed computers 11–21. Management computer 10 is a general purpose computer and includes a central processing unit, a display device, an input device and a storage device. Similarly, managed computers 11–21 are general purpose computers that include a central processing unit and a storage device. A portion of the storage device of management computer 10 is dedicated to cache memory in one embodiment of the present invention.

Managed computers 11–15 execute a Macintosh®-based operating system and are coupled to management computer 10 via a local area network 26 and a telecommunication path 23. Managed computer 16 executes a Unix-based operating system and is coupled to management computer 10 via communication path 24. Managed computers 17–21 execute a Windows®-based operating system and are coupled to management computer 10 via a local area network 27 and a communication path 25.

Figure 2:
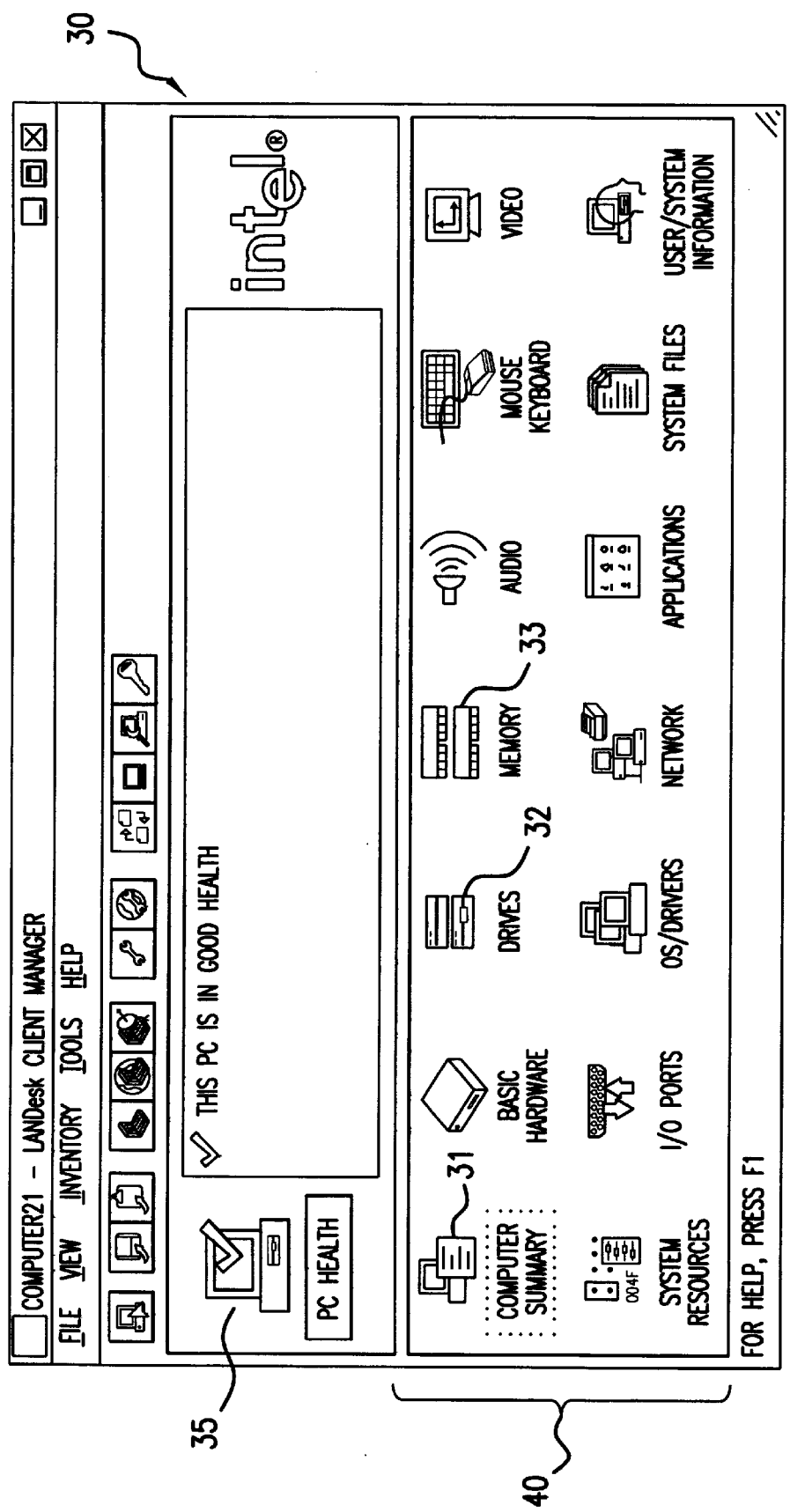
FIG. 2 illustrates an example of a management display for a managed computer in accordance with one embodiment of the present invention.

FIG. 2 illustrates an example of a management display 30 for managed computer 21 in accordance with one embodiment of the present invention. Management display 30 is output at management computer 10 on its display device so that it is accessible by a user of management computer 10.

Management display 30 includes a PC health icon 35 and a plurality of inventory icons 40. PC health icon 35 represents operational status information for managed computer 21. The inventory icons 40 represent management data that is available from managed computer 21 for computer resources controlled by managed computer 21. For example, computer summary icon 31 represents a summary of the computer resources located on managed computer 21. Drives icon 32 represents information about the disk drives on managed computer 21.

The number and type of inventory icons 40 displayed on management display 30 can differ for each managed computer 11–21 and management display 30 is individually configured by each managed computer 11–21. In one embodiment, management display 30 is generated for each managed computer 11–21 by management computer 10 based on inventory information received from managed computers 11–21. In this embodiment, when management computer 10 is coupled to a managed computer, e.g., managed computer 21, it requests an inventory file from managed computer 21. The inventory file includes descriptive information for inventory icons 40 and PC health icon 35, and the names of bitmap files used to create inventory icons 40. Management computer 10 then requests the bitmap files from managed computer 21. Management computer 10 then configures management display 30 by populating it with inventory icons 40 using the received bitmap files and the descriptive information received with the inventory file.

The inventory file received from managed computer 21 also includes an inventory icon identifier associated with each inventory icon 40. The inventory icon identifiers are used by management computer 10 to request information from managed computer 21 when one of the inventory icons 40 is selected. Each inventory icon identifier identifies both display information and management data associated with the inventory icon 40.

Therefore, when modifications are made to a managed computer (i.e., new computer resources are added), the inventory file on that managed computer is modified to reflect the changes. This will cause the configuration of the management display 30 for that managed computer to also be modified when management computer 10 receives the revised inventory file. In addition, when a new managed computer is added to the computer network, an inventory file for that computer is acquired by management computer 10 and management display 30 is then generated for that computer. Therefore, in the present invention, managed computers 11–21 configure management computer 10 each time managed computers 11–21 are coupled to management computer 10 and when computer resources owned by the managed computers 11–21 change.

Figure 3:
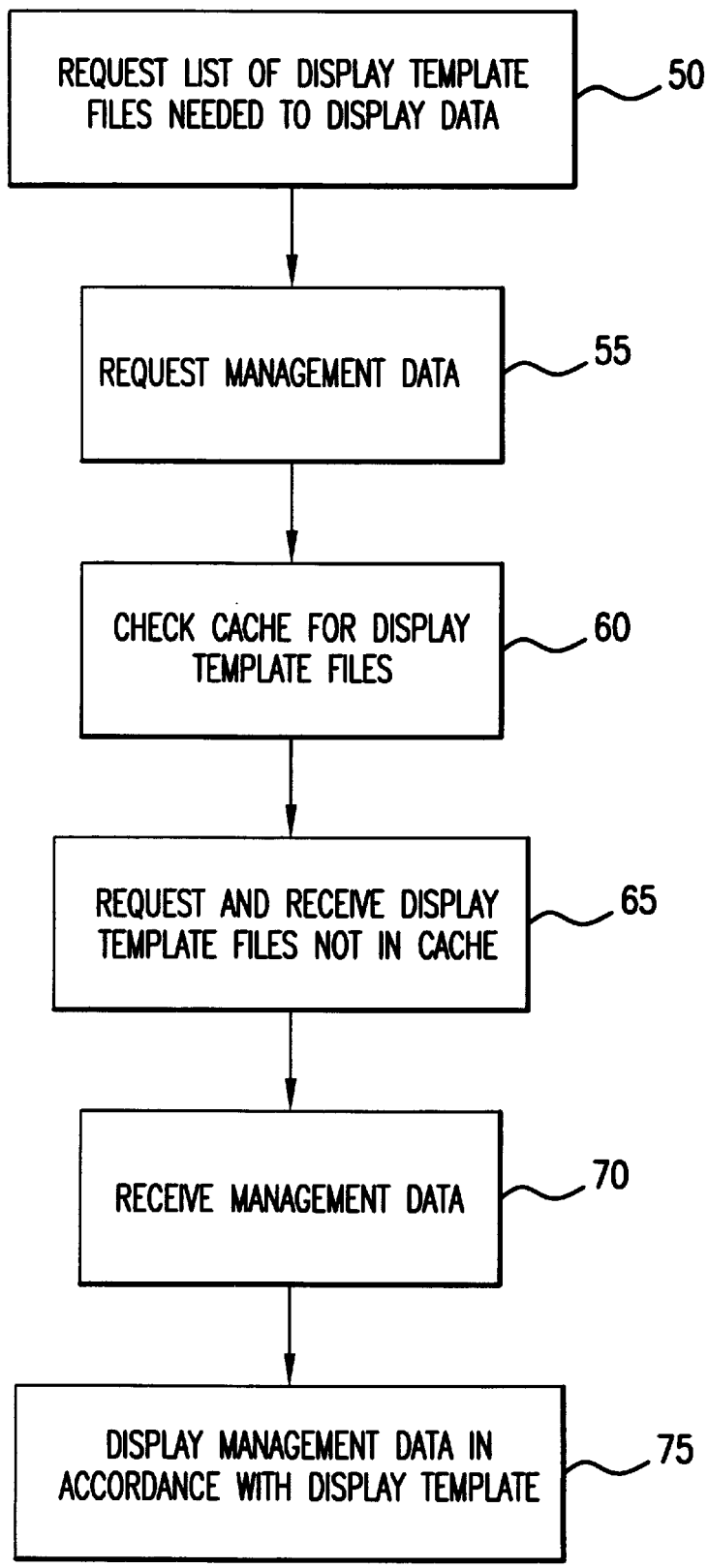
FIG. 3 is a flowchart of the steps executed by a management computer in accordance with one embodiment of the present invention when an inventory icon is selected.

When one of the inventory icons 40 is selected on management display 30, managed computer 21 provides to management computer 10 both the management data that corresponds to the selected inventory icon, and one or more display templates that configure the display of the management data on management computer 10. FIG. 3 is a flowchart of the steps executed by management computer 10 when an inventory icon 40 is selected.

At step 50, management computer 10 requests a list of display template files from managed computer 21 that are needed to display the management data. The request includes the inventory icon identifier so that managed computer 21 can identify which inventory icon was selected. In one embodiment, a display template file is a Hypertext Markup Language ("HTML") file. The HTML file can include JavaScript® and ActiveX® controls for an enhanced display. Further, more than one HTML file can be used when it is desired to display the management data in separate frames. The display template files can also include graphical files, audio files, or any other type of files that are used to display or present data, or enhance the display or presentation of data.

At step 55, management computer 10 requests the management data from managed computer 21. This request also includes the inventory icon identifier so that managed computer 21 can identify which inventory icon was selected. As previously described, the inventory icon identifier is received by management computer 10 from managed computer 21 when management display 30 is configured. In one embodiment, the management data comprises DMI data.

When the list of display template files is received from managed computer 21, management computer 10 determines whether any of the listed template files are stored in its cache memory at step 60. Template files are stored in cache memory if the same management data was recently requested by management computer 10 (i.e., a fresh snapshot of previously requested management data is requested). Step 60 avoids the need to transmit a template file that is already stored by management computer 10, thereby reducing data transmission requirements.

At step 65, management computer 10 requests display template files that are not stored in its cache. In response, the display template files are received from managed computer 21. The display files are stored in the cache memory of management computer 10.

At step 70, management computer 10 receives the requested management data from managed computer 21. The management data is then displayed in a "dialog" on management computer 10 at step 75. Management computer 10 uses the received display templates to display the management data in the dialog. Therefore, managed computer 21 customizes and configures the display of data on management computer 10.

Figure 4:
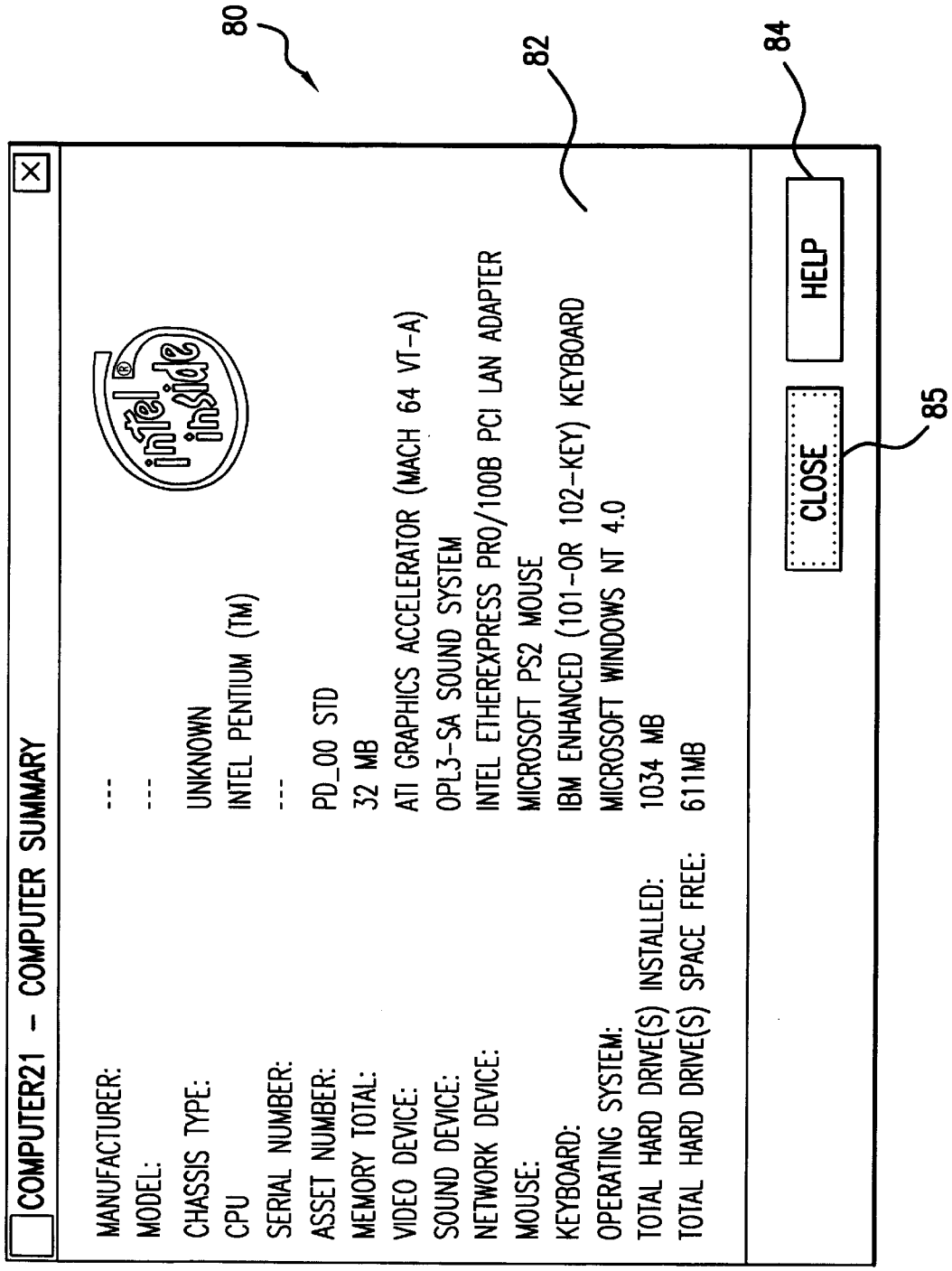
FIG. 4 illustrates an example of a dialog that is displayed by a management computer in accordance with one embodiment of the present invention.
Figure 5:
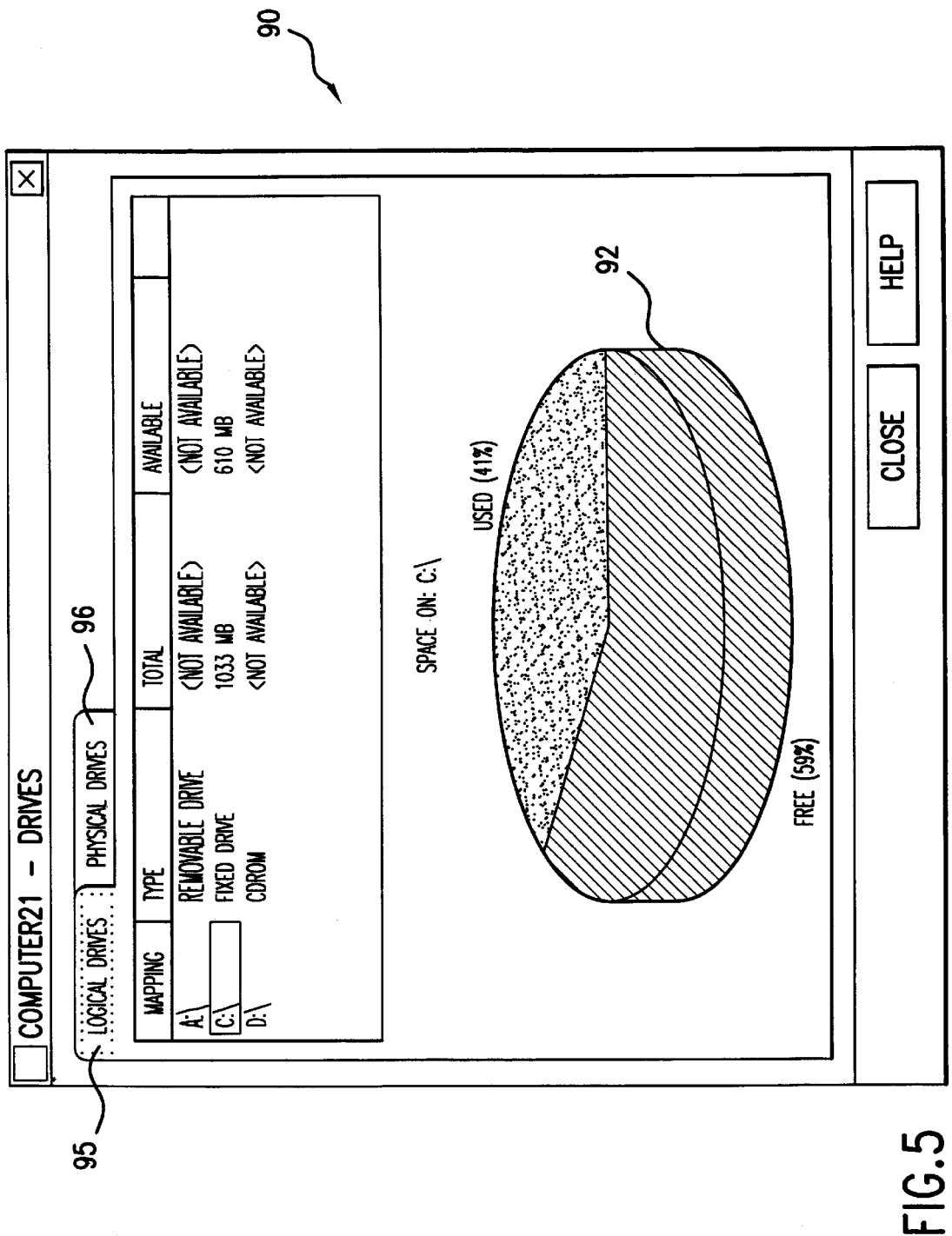
FIG. 5 illustrates another example of a dialog that is displayed by a management computer in accordance with one embodiment of the present invention.
Figure 6:
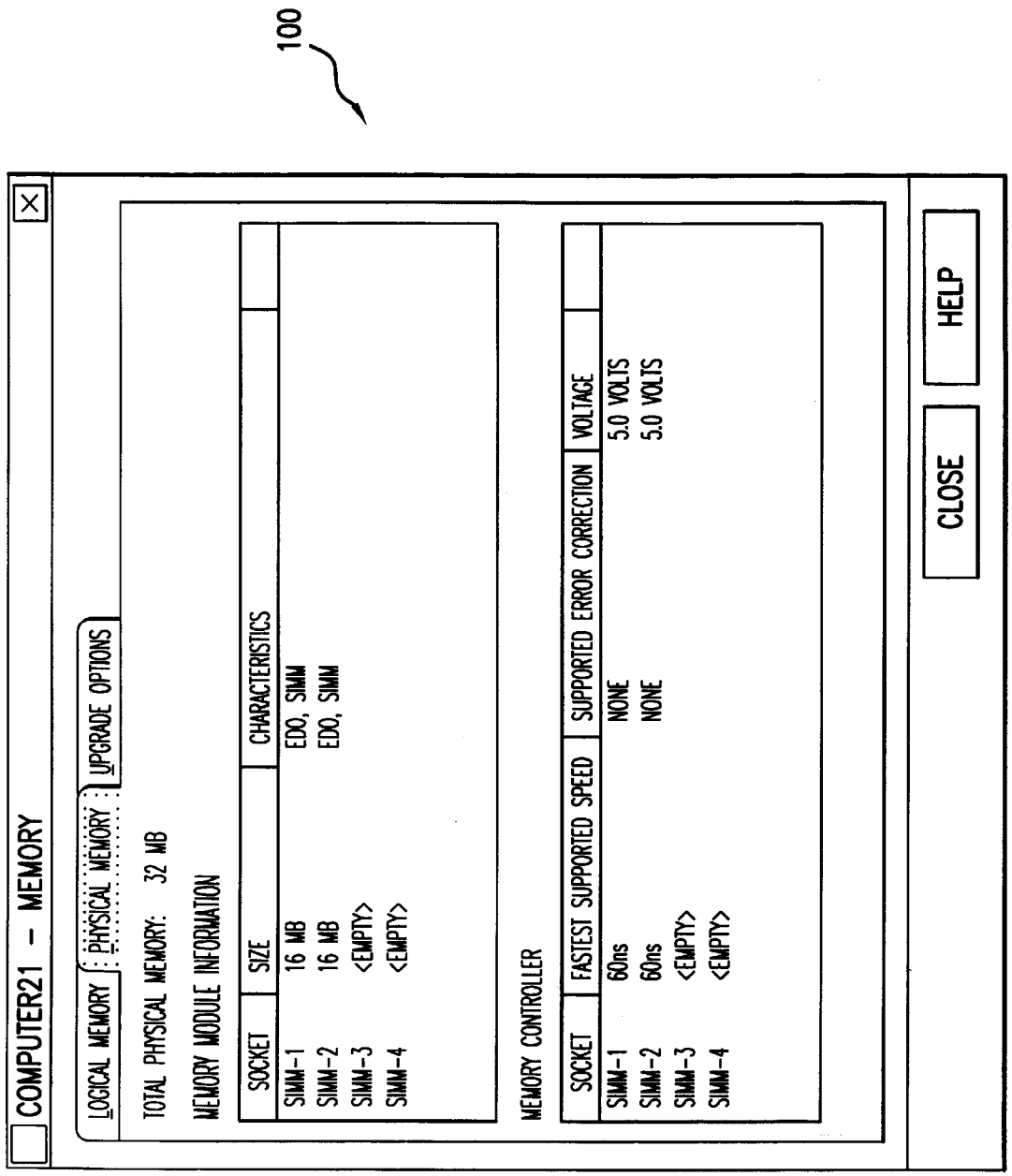
FIG. 6 illustrates another example of a dialog that is displayed by a management computer in accordance with one embodiment of the present invention.

FIGS. 4–6 illustrate examples of dialogs that are displayed by management computer 10 in accordance with one embodiment of the present invention. FIG. 4 is a dialog 80 that is displayed in response to selecting inventory icon 31 shown in FIG. 2. Dialog 80 includes an area 82 that displays management data, and buttons 84 and 85. The selection of Help button 84 displays help information that is provided to management computer 10 by a managed computer. Therefore, in the present invention the help information is also configured by each managed computer.

FIG. 5 is a dialog 90 that is displayed in response to selecting inventory icon 32. Dialog 90 includes tabs 95, 96 that selectively display management data. Dialog 90 further includes a pie chart 92 that dynamically displays management data graphically. Finally, FIG. 6 is a dialog 100 that is displayed in response to selecting inventory icon 33.

As illustrated by dialogs 80, 90 and 100, the management data can be displayed in a customized manner that is easy to read and understand by a user of management computer 10. The configuration of the dialogs is specified by the display templates received from the managed computers. Therefore, the managed computers in the present invention configure the display of management data on management computer 10.

The managed computers can configure the display of management data on management computer 10 so that each managed computer is distinctive to a user of management computer 10. For example, it may be desirable for the dialogs for managed computer 18 to include the logo of the manufacturer managed of computer 18 as a background for the management data. To accomplish this, the display templates for managed computer 18 configure the dialogs on management computer 10 to display the logo. Similarly, it may be desirable for the dialogs for managed computer 20 to be enabled for a visually impaired user of management computer 10. To accomplish this, the display templates for managed computer 20 configure the dialogs on management computer 10 to include audio files when displaying management data.

As described, in the system for managing a computer network in accordance with the present invention managed computers configure the management computer. Therefore, management characteristics of each managed computer can be uniquely defined on the managed computer instead of on the management computer. Any changes to a managed computer can be easily accommodated by modifying files on the managed computer without requiring changes to the management computer.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of remotely managing one or more managed computers from a management computer, said method comprising the steps of:

generating management data and providing a display template at one of the one or more managed computers;

transmitting the management data to the management computer; and displaying the management data at the management computer in accordance with the display template.

2. The method of claim 1, further comprising the steps of:

transmitting the display template to the management computer; and storing the display template at the management computer.

3. The method of claim 1, wherein the management computer comprises a cache memory, further comprising the steps of:

determining whether the display template is stored in the cache memory;

transmitting the display template to the management computer if it is determined that the display template is not stored in the cache memory; and storing the display template at the management computer.

4. The method of claim 1, further comprising the steps of:

receiving an inventory file from the managed computer; and generating and outputting a management display at the management computer in accordance with the inventory file.

5. The method of claim 4, wherein the management display comprises a plurality of icons and wherein each of the icons represent the management data.

6. The method of claim 5, wherein the step of transmitting the management data is in response to a selection of one of the plurality of icons.

7. The method of claim 1, wherein the display template comprises a Hypertext Markup Language file.

8. The method of claim 1, wherein the management data comprises Desktop Management Interface data.

9. The method of claim 1, wherein the one or more managed computers comprise a first managed computer that executes a first operating system and a second managed computer that executes a second operating system.

10. A system for remotely managing computers comprising:

at least one managed computer, wherein one of said at least one managed computer is programmed to generate management data and provide a display template; and a management computer coupled to said at least one managed computer, wherein said management computer is programmed to display said management data in accordance with said display template.

11. The system of claim 10, wherein said one of said at least one managed computer is programmed to provide an inventory file, and said management computer is programmed to generate and output a management display in accordance with said inventory file.

12. The system of claim 10, wherein said one of said at least one managed computer is programmed to transmit said management data and said display template to said management computer.

13. The system of claim 10, wherein said management computer comprises a cache memory and said one of said at least one managed computer is programmed to transmit said management data to said management computer, and wherein said one of said at least one managed computer is programmed to transmit said display template to said management computer if said management computer determines that said display template is not stored in said cache memory.

14. The system of claim 11, wherein said management display comprises a plurality of icons and each of said icons represent said management data.

15. The system of claim 14, wherein said one of said at least one managed computer is programmed to transmit said management data in response to a selection of one of said plurality of icons.

16. The system of claim 10, wherein said display template comprises a Hypertext Markup Language file.

17. The system of claim 10, wherein said management data comprises Desktop Management Interface data.

18. The system of claim 10, wherein said at least one managed computer comprises a first managed computer that executes a first operating system and a second managed computer that executes a second operating system.

19. The system of claim 10, wherein said inventory file comprises an inventory icon identifier and at least one name of a bitmap file.

20. A management computer that remotely manages one or more managed computers, wherein one of the one or more managed computers generates management data and provides a display template, said management computer comprising:

a processor;

a storage device coupled to said processor; and a display device coupled to said processor;

wherein said processor is coupled to the one of the one or more managed computers and said processor is programmed to display the management data on said display device in accordance with the display template.

21. The management computer of claim 20, wherein the one of the one or more managed computers provides an inventory file, said management computer further programmed to:

generate and output a management display on said display device in accordance with the inventory file.

22. The management computer of claim 21, said management computer further programmed to:

request the management data and the display template from the one of the one or more managed computers.

23. The management computer of claim 21, wherein said storage device comprises a cache memory, said management computer further programmed to:

determine whether the display template is stored in said cache memory; and request the management data and the display template from the one of the one or more managed computers.

24. The management computer of claim 21, wherein said management display comprises a plurality of icons and each of said icons represent the management data.

25. The management computer of claim 20, wherein the display template comprises a Hypertext Markup Language file.

26. The management computer of claim 20, wherein the management data comprises Desktop Management Interface data.

* * * * *